United States Patent
Kizaki et al.

(10) Patent No.: US 7,981,526 B2
(45) Date of Patent: Jul. 19, 2011

(54) DISPLAY DEVICE

(75) Inventors: Yukio Kizaki, Kawasaki (JP); Rei Hasegawa, Yokohama (JP); Hajime Yamaguchi, Kawasaki (JP); Isao Amemiya, Machida (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 332 days.

(21) Appl. No.: 12/211,940

(22) Filed: Sep. 17, 2008

(65) Prior Publication Data

US 2009/0243502 A1  Oct. 1, 2009

(30) Foreign Application Priority Data

Mar. 25, 2008 (JP) ................ 2008-078742

(51) Int. Cl.
*H05B 41/14* (2006.01)
*H01J 1/62* (2006.01)
*H01L 29/04* (2006.01)

(52) U.S. Cl. .......... 428/690; 428/917; 257/40; 315/246; 313/483

(58) Field of Classification Search .................. None
See application file for complete search history.

(56) References Cited

U.S. PATENT DOCUMENTS

| | | | |
|---|---|---|---|
| 6,014,193 A | 1/2000 | Taira et al. | |
| 7,002,723 B2 | 2/2006 | Enomoto et al. | |
| 2006/0082588 A1* | 4/2006 | Mizuno et al. | 345/558 |

FOREIGN PATENT DOCUMENTS

| | | |
|---|---|---|
| JP | 10-135540 | 5/1998 |
| JP | 2005-71616 | 3/2005 |
| JP | 2005292258 A * | 10/2005 |

OTHER PUBLICATIONS

Machine translation of JP2005-292258. Date of publication: Oct. 20, 2005.*
U.S. Appl. No. 12/199,213, filed Aug. 27, 2008.
U.S. Appl. No. 12/236,868, filed Sep. 24, 2008, Nakao, et al.
U.S. Appl. No. 12/211,964, filed Sep. 17, 2008, Kizaki, et al.

* cited by examiner

*Primary Examiner* — D. Lawrence Tarazano
*Assistant Examiner* — Andrew K Bohaty
(74) *Attorney, Agent, or Firm* — Oblon, Spivak, McClelland, Maier & Neustadt, L.L.P.

(57) ABSTRACT

A light-emitting device is provide, which includes a first substrate, a first electrode and a second electrode, which are disposed above the first substrate and insulated from each other, enabling a difference in electrical potential to be given between the first electrode and the second electrode, a second substrate disposed to face the first substrate and spaced apart from the first substrate, a light-emitting layer disposed between the first substrate and the second substrate, the light-emitting layer includes a light-emitting material which emits light through an electrochemical oxidation or reduction thereof and chloride ions, and a barrier electrode interposed between the first electrode and the second electrode to partition the light-emitting layer. This barrier electrode is used as a standard for the electrical potential.

20 Claims, 2 Drawing Sheets

DISPLAY DEVICE

CROSS-REFERENCE TO RELATED APPLICATIONS

This application is based upon and claims the benefit of priority from prior Japanese Patent Application No. 2008-078742, filed Mar. 25, 2008, the entire contents of which are incorporated herein by reference.

BACKGROUND OF THE INVENTION

1. Field of the Invention

The present invention relates to an electrochemically luminescent display device which induces a chemical reaction as a voltage is applied thereto, thereby enabling the display device to chemically emit light.

2. Description of the Related Art

Although there are persistent expectations for the application of an organic electroluminescent (EL) display device to a display device due to the capabilities thereof for full-color display and for reducing the thickness of the device, there are various drawbacks accompanied with the injection of electric charges. As means for overcoming these drawbacks, there has been developed an electrochemically luminescent (ECL) display device utilizing electrochemical luminescence, wherein a chemical reaction is induced by the application of voltages to the display device, thereby enabling the display device to chemically emit light.

Since the light-emitting layer of the ECL display device is constituted by a liquid exhibiting fluidity, the materials of the light-emitting layer are more liable to circulate as compared with an organic EL display device wherein the light-emitting layer thereof is constituted by solid materials. Therefore, the ECL display device can be hardly suffered from defective fixed points such as defective sticking and hence the ECL display device is generally excellent in reliability. Further, since the ECL display device is constituted by a mono-layer structure comprising a solution of electrochemically luminescent materials, and electrodes for applying an electrical potential to the solution, it is not required to laminate a charge-transporting layer which is required in the case of the organic EL display device. Because of this, the ECL display device can be manufactured at a lower cost as compared with the organic EL display device. Furthermore, the ECL display device can be actuated at a lower voltage according to the principle based on an electrochemical reaction.

In the case of the ordinary display devices, the optical characteristics thereof can be controlled through the application of a potential difference by a couple of electrodes. On the other hand, in the case of the ECL display device, since an electrochemical reaction is utilized for the emission of light, it is required to control the optical characteristics thereof by accurately applying the oxidation-reduction potential of a light-emitting material since an electrochemical reaction is utilized for the emission of the ECL display device. In the case of a 2-electrode system, it is not clear how the potential difference that has been applied to the display device is distributed to a couple of electrodes, so that it is impossible to make clear as to at what level the electrical potential of each of these electrodes is existed. Because of this, it is required to express the electrical potential of these electrodes by an electrode (reference electrode) that can indicate a prescribed electrode reaction to be used as a certain standard.

In JP-A 10-135540 (KOKAI), there is proposed an electrochemically luminescent cell, which comprises a solution of electrochemically luminescent materials, an electrode for applying an electrical potential to the solution, a reference electrode acting as a standard, and a vessel for housing the solution and these electrodes. This patent document however fails to specifically describe the size and structure of the reference electrode. Since the reference electrode is an electrode functioning as a standard for electrical potential, if this reference electrode has deteriorated, it would become impossible to control so as to secure a stable electrical potential, thus making it difficult to obtain a display device exhibiting sufficient emission efficiency and excellent reliability.

BRIEF SUMMARY OF THE INVENTION

A display device according to one aspect of the present invention comprises:

a first substrate;

a first electrode and a second electrode, which are disposed above the first substrate and insulated from each other, enabling a difference in electrical potential to be given between the first electrode and the second electrode;

a second substrate disposed to face the first substrate and spaced apart from the first substrate;

a light-emitting layer disposed between the first substrate and the second substrate, the light-emitting layer comprising a light-emitting material which emits light through an electrochemical oxidation or reduction thereof and chloride ions; and a barrier electrode interposed between the first electrode and the second electrode to partition the light-emitting layer, the barrier electrode having a fest end and a second end, the first end being in contact with the first substrate and the second end being in contact with the second substrate, and functioning as a spacer, the barrier electrode functioning as a standard for the electrical potential.

A display device according to another aspect of the present invention comprises:

a first substrate and a second substrate, which are disposed to face each other and spaced apart from each other;

a first electrode mounted above the first substrate and a second electrode mounted above the second substrate, enabling a difference in electrical potential to be given between the first electrode and the second electrode;

a light-emitting layer disposed between the first substrate and the second substrate, the light-emitting layer comprising a light-emitting material which emits light through an electrochemical oxidation or reduction thereof and chloride ions; and a barrier electrode interposed between the first electrode and the second electrode to partition the light-emitting layer, the barrier electrode having a fest end and a second end, the first end being in contact with the first substrate and the second end being in contact with the second substrate, and functioning as a spacer, the barrier electrode functioning as a standard for the electrical potential.

DETAILED DESCRIPTION OF THE INVENTION

Next, embodiments of the present invention will be explained with reference to drawings.

Figure 1:
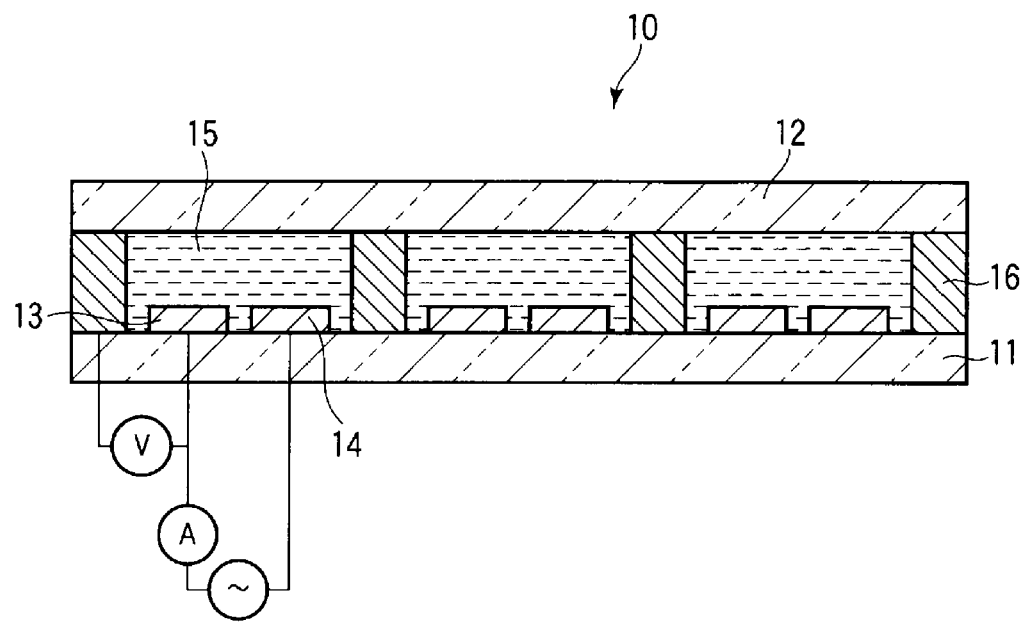
FIG. 1 is a cross-sectional view of the display device according to one embodiment.

In a display device 10 illustrated in FIG. 1, only part of monochromatic pixels is shown. The display device 10 comprises a first substrate 11 having a first electrode 13 and a second electrode 14 mounted thereon, and a second substrate 12 disposed to face the first substrate 11 and spaced apart from the first substrate 11. One pixel is constituted by a couple of the first electrode 13 and the second electrode 14.

A light-emitting layer 15 formed of a liquid layer is interposed between the first substrate 11 and the second substrate 12. This light-emitting layer 15 contains a light-emitting material (i.e. an electrochemically luminescent (ECL) material) which emits light through an electrochemical oxidation or reduction thereof, and an electrolyte. As described hereinafter, in order to enable a barrier electrode 16 to function as a reference electrode, the light-emitting layer 15 contains chloride ions ($Cl^-$).

The barrier electrode 16 is interposed between the first substrate 11 and the second substrate 12, thus functioning as a spacer and partitioning the light-emitting layer 15. This barrier electrode 16 is formed of silver/silver chloride (Ag/AgCl) and used as a reference electrode acting as a standard of electrical potential.

The first substrate 11 may be constituted, for example, by glass or plastic materials. As the plastic materials, the examples thereof include polyethylene terephthalate (PET), polyethylene naphthalate (PEN), polyether sulfone (PES), polycarbonate (PC), etc. If this first substrate 11 is to be disposed as an observation face, this first substrate 11 should preferably be selected from materials which are minimal in absorption of the light of visible light zone. More specifically, this first substrate 11 may be constituted by PEN film (trade name: Teonex, Teijinn Du Pont Film Co., Ltd.), PES film (trade name: Sumilite, Sumitomo Bakelite Co., Ltd.), etc.

If this first substrate 11 is to be disposed as an observation face, the first electrode 13 and the second electrode 14 are required to be transparent and hence they are constituted by a transparent conductive film. Examples of the transparent conductive film include metal oxide semiconductors such as oxides of transition metals such as titanium, zirconium, hafnium, strontium, zinc, tin, indium, yttrium, lanthanum, vanadium, niobium, tantalum, chromium, molybdenum and tungsten. It is also possible to employ perovskite such as $SrTiO_3$, $CaTiO_3$, $BaTiO_3$, $MgTiO_3$, $SrNb_2O_6$, etc. Alternatively, the transparent electrode may be formed by composite oxides or mixed oxides of the aforementioned materials; GaN; etc.

On the other hand, when the second substrate 12 is to be disposed as an observation face, the first electrode 13 and the second electrode 14 may not necessarily be transparent but may be constituted by a reflective electrode. In this case, the first electrode 13 and the second electrode 14 may be constituted by a metal such as Al, Ag, etc.

In order to increase the aperture ratio, the size of the first electrode 13 and the second electrode 14 should preferably be as large as possible. For example, the size of these electrodes may be 200 μm×200 μm and the aperture ratio thereof may be 50% or so. The first electrode 13 and the second electrode 14 should preferably be both formed of the same material and of the same size.

The barrier electrode 16 can be formed by the coating of a silver paste on the first substrate 11 by screen printing. This barrier electrode 16 is interposed between the first substrate 11 and the second substrate 12, thus functioning as a spacer and partitioning the interior of light-emitting layer 15. In order to enable this barrier electrode 16 to function as a reference electrode acting as a standard of electrical potential, chloride ions ($Cl^-$) are incorporated in the light-emitting layer 15.

The second substrate 12 may be constituted by the same material as that employed in the first substrate 11. If the observation face is to be constituted by this second substrate 12, the second substrate 12 should preferably be selected from materials which are minimal in absorption of the light of visible light zone.

As the light-emitting materials (ECL materials) to be contained in the light-emitting layer 15, it is possible to employ polycyclic aromatic compounds, π-electron conjugated polymers, heteroaromatic compounds, chelate metal complexes, organometallic compounds, chelate lanthanoid complexes, etc.

Examples of the polycyclic aromatic compounds include naphthacene derivatives (rubrene, 5,12-diphenyl naphthacene), anthracene derivatives (9,10-diphenyl anthracene), pentacene derivatives (6,10-diphenyl pentacene), perifurantene derivatives (dibenzotetra(methylphenyl) perifurantene), etc.

As the π-electron conjugated macromolecular compounds, it is possible to employ, for example, polyparaphenylene vinylene derivatives, polythiophene derivatives, polyparaphenylene derivatives, polyfluorene derivatives, etc. As the heteroaromatic compounds, it is possible to employ, for example, coumalin, etc. As the chelate metal complexes, it is possible to employ, for example, tris-bipyridine ruthenium, etc. Further, as the organometallic compounds, it is possible to employ, for example, tris(2-phenyl pyridine)iridium, etc.

In order to facilitate the oxidation-reduction of the ECL material, the light-emitting layer 15 should preferably be formulated to contain a supporting salt. In this case, in order to facilitate the dissociation of the supporting salt into ions, a solvent (for a liquid electrolyte) or an ionic liquid exhibiting high ionic conductivity should preferably be contained in the light-emitting layer 15.

With respect to the supporting salt, examples thereof include tetrabutyl ammonium perchlorate (TBAP), potassium hexafluorophosphate, lithium trifluoromethane sulfonate, lithium perchlorate, tetra-n-butyl ammonium tetrafluoroborate, tripropyl amine, tetra-n-butyl ammonium fluoroborate, etc.

With respect to the solvent, examples thereof include acetonitrile, N,N-dimethyl formamide, propylene carbonate, o-dichlorobenzene, glycerin, water, ethyl alcohol, propyl alcohol, dimethyl carbonate, ethylene carbonate, γ-butyrolactone, NMP, 2-methyl tetrahydrofuran, toluene, tetrahydrofuran, benzonitrile, cyclohexane, normal hexane, acetone, nitrobenzene, 1,3-dioxolane, furan, benzofluoride, etc.

With respect to the ionic liquid, it is possible to employ ammonium-based ions such as imidazolium salts and pyridinium salts; phosphonium-based ions; halogen-based ions; fluorinated ions such as fluoride ions and triflate; etc.

For the fabrication of the light-emitting layer 15, a supporting salt and an ECL material are dissolved in any one of the aforementioned solvents to create a solution. Then, this solution is poured into a space between the second substrate 12 and the first substrate 11 having the first electrode 13 and the second electrode 14 mounted thereon.

On the occasion of performing luminescent display by actuating the display device 10, the first electrode 13, the second electrode 14 and the barrier electrode 16 are all connected with a controlled potential driving device (a potentiostat) and then AC voltage is applied between the first electrode 13 and the second electrode 14. As the frequency of the AC voltage, it may be several tens of Hz for instance.

Although not shown in the drawings, during the period of luminous state, the electrical potential to the barrier electrode 16 of the second electrode 14 becomes an electrical potential of reverse polarity in opposite to that applied to the first electrode 13.

For example, while a voltage is applied to the first electrode 13 in such a manner that the electrical potential of the first electrode 13 becomes V1 and V2 by turns, a voltage of reverse polarity is applied to the second electrode 14. Herein V1 is a reduction potential having negative values where the ECL material becomes anion radical, and V2 is an oxidation potential having positive values where the ECL material becomes cation radical. As a result, in the vicinity of the first electrode 13 and the second electrode 14, the anion radical and cation radical of the ECL material generate alternately. More specifically, the ECL material is oxidized due to the application of a voltage to generate cation radicals which are oxidation species and, at the same time, the ECL material is reduced to generate anion radicals which are reduction species.

Due to the association of these radicals, the ECL material is brought into an excited state and then the emission of light takes place in the process of deactivation of the excited state. By taking advantages of these phenomena, the luminous display is performed. Unless the voltage is applied in this manner, the ECL material will be kept in a non-emission state.

According to this embodiment, since the barrier electrode 16 is positioned equidistantly away from the first electrode 13 and the second electrode 14, it is possible to realize a high aperture ratio. Moreover, since it is possible to secure the barrier electrode 16 having a sufficiently large size, it is possible to procure a stable control of electrical potential. As a result, non-uniformity of luminance can be minimized, thus making it possible to enhance the reliability of the display device.

Figure 2:
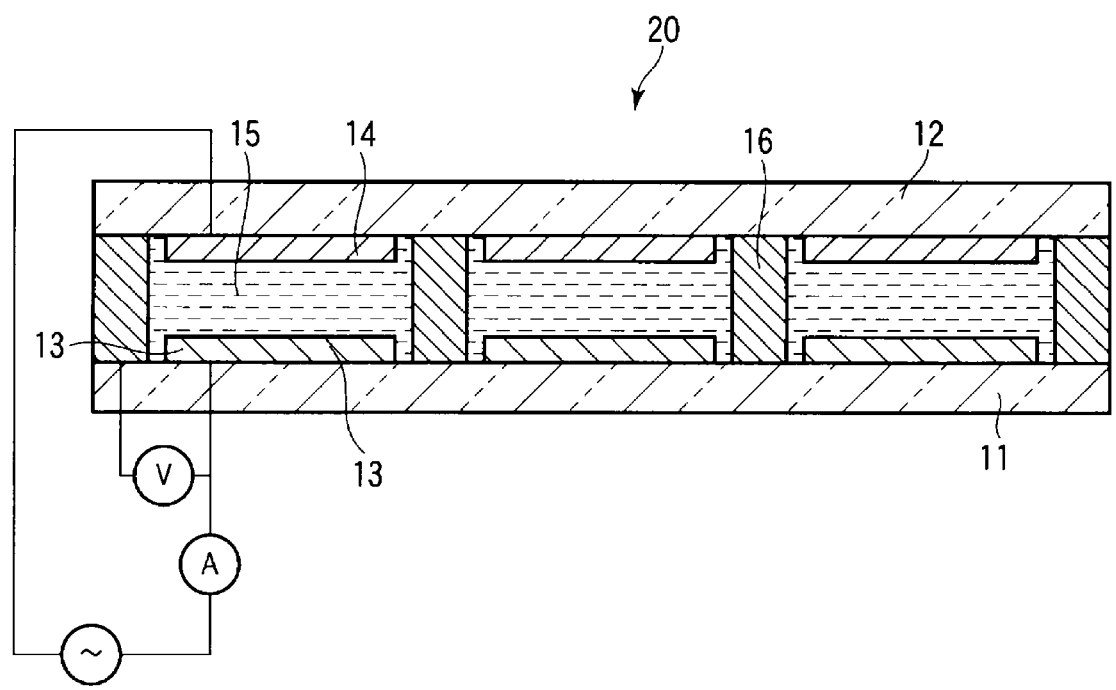
FIG. 2 is a cross-sectional view of the display device according to another embodiment.

In this display device 20 shown in FIG. 2, the first electrode 13 is mounted on the first substrate 11 and the second electrode 14 is mounted on the second substrate 12. Excepting these features, the display device 20 is constructed in the same manner as the device of FIG. 1.

Each of component members may be constructed in the same manner as explained in FIG. 1. As already explained above, the substrate to be disposed as an observation face should desirably be constituted by a material which is minimal in absorption of light of visible light zone. In this case, the electrode to be mounted on the substrate constituting the observation face is constituted by a transparent conductive material.

As in the case of the previous embodiment, even in the display device 20 shown in FIG. 2, since the barrier electrode 16 is positioned equidistantly away from the first electrode 13 and the second electrode 14, it is possible to realize a high aperture ratio. Moreover, since it is possible to secure the barrier electrode 16 having a sufficiently large size, it is possible to procure a stable control of electrical potential. As a result, non-uniformity of luminance can be minimized, thus making it possible to enhance the reliability of the display device.

Followings are examples of the present invention.

EXAMPLE 1

By following the procedures explained below, a display device provided with monochromic pixels and constructed as shown in FIG. 1 was manufactured. In this case, the display device was manufactured to have a size of 2.5 inches×2.5 inches with the size of each pixel being set to a 100 μm×100 μm square.

A 1.1-mm-thick glass substrate was prepared as a first substrate 11 and an ITO film having a thickness of 1000 Å was deposited on the first substrate 11. Then, the ITO film was patterned to form the first electrode 13 and the second electrode 14.

As the second substrate 12, a glass substrate was prepared.

By screen printing method, a silver paste was coated on the first substrate 11 to form the barrier electrode 16. The width of the barrier electrode 16 was set to 10 μm and the height thereof was set to 20 μm. The first substrate 11 and the second substrate 12 were superimposed one another so as to secure a gap of 20 μm therebetween. Then, all of the circumferential gap portions of these substrates excluding a pouring port were sealed with epoxy resin (sealing adhesive) to create a light-emitting layer cell.

10 mM of lithium trifluoromethane sulfonate, 90 mM of TBAP and 1M of potassium chloride (chloride ions) were respectively prepared as a supporting salt. On the other hand, ortho-dichlorobenzene (o-DCB) and acetonitrile (AN) were mixed with each other at a ratio of 3:1 to prepare a solvent. Then, the aforementioned supporting salt was dissolved in this solvent to prepare an electrolyte, to which 10 mM of rubrene was added, thus obtaining a solution to be used as a raw material for the light-emitting layer.

Then, this raw material was poured into the light-emitting layer cell to manufacture the light-emitting layer 15, thus obtaining the display device of this example.

The first electrode 13, the second electrode 14 and the barrier electrode 16 were connected with a controlled potential driving device (a potentiostat) and then an AC voltage of ±3V was applied between the first electrode 13 and the second electrode 14. As a result, it was possible to observe the emission of yellow light and this emission was observed for one hour. The coefficient of fluctuation of emission luminance was confined to not more than 3%, thus confirming that it was possible to secure stable operation in the display device of this example.

EXAMPLE 2

By following the procedures explained below, a display device provided with monochromic pixels and constructed as shown in FIG. 2 was manufactured. In this case, the display device was manufactured to have a size of 2.5 inches×2.5 inches with the size of each pixel being set to a 100 μm×100 μm square.

A 1.1-mm-thick glass substrate was prepared as a first substrate 11 and an ITO film having a thickness of 1000 Å was deposited on the first substrate 11. Then, the ITO film was patterned to form the first electrode 13.

In the same manner, a 1.1-mm-thick glass substrate was prepared as a second substrate 12 and an ITO film having a thickness of 1000 Å was deposited on the second substrate 12. Then, the ITO film was patterned to form the second electrode 14.

By screen printing method, a silver paste was coated on the first substrate 11 to form the barrier electrode 16. The width of the barrier electrode 16 was set to 8 μm and the height thereof was set to 10 μm. The first substrate 11 and the second substrate 12 were superimposed one another so as to secure a gap of 10 μm therebetween. Then, all of the circumferential gap portions of these substrates excluding a pouring port were sealed with epoxy resin (sealing adhesive) to create a light-emitting layer cell.

10 mM of lithium trifluoromethane sulfonate, 90 mM of TBAP and 1M of potassium chloride (chloride ions) were respectively prepared as a supporting salt. On the other hand, o-DCB and AN were mixed with each other at a ratio of 3:1 to prepare a solvent. Then, the aforementioned supporting salt was dissolved in this solvent to prepare an electrolyte, to which 10 mM of rubrene was added, thus obtaining a solution to be used as a raw material for the light-emitting layer.

Then, this raw material was poured into the light-emitting layer cell to manufacture the light-emitting layer 15, thus obtaining the display device of this example.

The first electrode 13, the second electrode 14 and the barrier electrode 16 were connected with a controlled potential driving device (a potentiostat) and then an AC voltage of ±3.5V was applied between the first electrode 13 and the second electrode 14. As a result, it was possible to observe the emission of yellow light and this emission was observed for two hours. The coefficient of fluctuation of emission luminance was confined to not more than 5%, thus confirming that it was possible to secure stable operation in the display device of this example.

COMPARATIVE EXAMPLE

Figure 3:
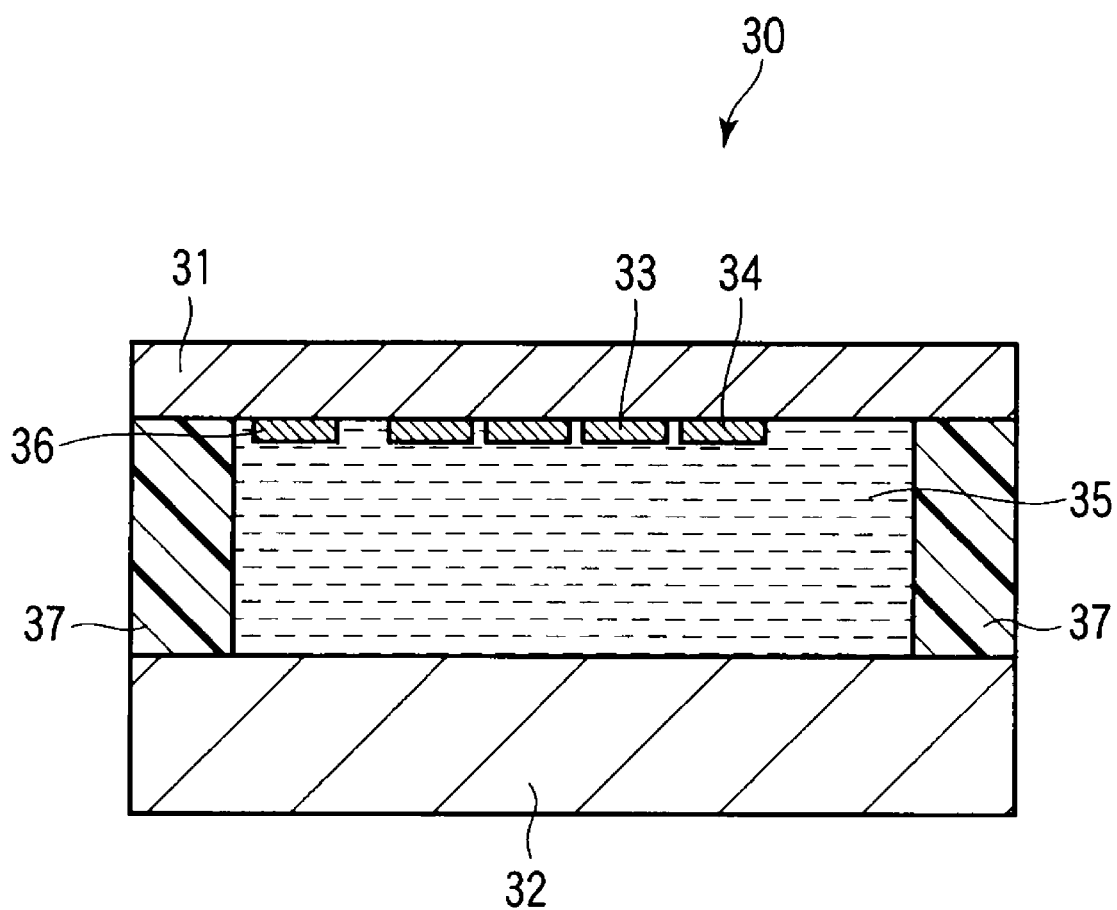
FIG. 3 is a cross-sectional view of the display device according to a comparative example.

By following the procedures explained below, a display device provided with monochromic pixels and constructed as shown in FIG. 3 was manufactured. In this case, the display device was manufactured to have a size of 2.5 inches×2.5 inches with the size of each pixel being set to a 100 μm×100 μm square.

A 1.1-mm-thick glass substrate was prepared as a first substrate 31 and an ITO film having a thickness of 1000 Å was deposited on the first substrate 31. Then, the ITO film was patterned to form the first electrode 33 and the second electrode 34.

Additionally, an Ag film having a thickness of 1000 Å was deposited and then patterned to obtain a reference electrode 36 having a configuration of a 20 μm×20 μm square.

A glass substrate to be used as a second substrate 32 was superimposed on the first substrate 31 with a resin spacer 37 having a thickness of 2 μm being interposed therebetween to create a light-emitting layer cell.

A raw material for the light-emitting layer was prepared according to the same formulation as described in Example 1 and then poured into the light-emitting layer cell to create a light-emitting layer 35, thus obtaining the display device of this comparative example.

An AC voltage of ±3V was applied between the first electrode 33 and the second electrode 34. As a result, it was possible to observe the emission of yellow light. However, in the case of this display device of comparative example, the reference electrode could not be stabilized and hence it was only possible to repeat the emission of light with the period of emission being limited to very short time. When the emission time period of this display device was measured, it was only 5 minutes and the emission luminance was lowered by 60%.

According to the embodiment of present invention, it is possible to provide a display device which is minimal in deterioration with time such as non-uniformity of luminance, is excellent in reliability and is capable of generating electrochemical luminescence with high efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device comprising:
a first substrate;
a first electrode and a second electrode, which are disposed above the first substrate and insulated from each other, enabling a difference in electrical potential to be given between the first electrode and the second electrode;
a second substrate disposed to face the first substrate and spaced apart from the first substrate;
a light-emitting layer disposed between the first substrate and the second substrate, the light-emitting layer comprising a light-emitting material which emits light through an electrochemical oxidation or reduction thereof and chloride ions; and
a barrier electrode interposed between the first electrode and the second electrode to partition the light-emitting layer, the barrier electrode having a first end and a second end, the first end being in contact with the first substrate and the second end being in contact with the second substrate, and functioning as a spacer, the barrier electrode also functioning as a standard for the electrical potential.

2. The device according to claim 1, further comprising an AC power source providing potential difference between the first electrode and the second electrode;
and a controlled potential driving device connected with the first electrode, the second electrode and the barrier electrode.

3. The device according to claim 1, wherein the first substrate and the second substrate comprise glass or plastics.

4. The device according to claim 1, wherein the first electrode and the second electrode comprise a transparent conductive material.

5. The device according to claim 1, wherein the light-emitting material is selected from the group consisting of polycyclic aromatic compounds, π-electron conjugated polymers, heteroaromatic compounds, chelate metallic complexes, organometallic compounds and chelate lanthanoid complexes.

6. The device according to claim 1, wherein the light-emitting layer comprises a supporting salt.

7. The device according to claim 6, wherein the supporting salt is selected from the group consisting of tetrabutyl ammonium perchlorate, potassium hexafluorophosphate, lithium trifluoromethane sulfonate, lithium perchlorate, tetra-n-butyl ammonium tetrafluoroborate, tripropyl amine and tetra-n-butyl ammonium fluoroborate.

8. The device according to claim 1, wherein the light-emitting layer comprises a solvent.

9. The device according to claim 8, wherein the solvent is selected from the group consisting of acetonitrile, N,N-dimethyl formamide, propylene carbonate, o-dichlorobenzene, glycerin, water, ethyl alcohol, propyl alcohol, dimethyl carbonate, ethylene carbonate, γ-butyrolactone, NMP, 2-methyl tetrahydrofuran, toluene, tetrahydrofuran, benzonitrile, cyclohexane, normal hexane, acetone, nitrobenzene, 1,3-dioxolane, furan and benzofluoride.

10. The device according to claim 1, wherein the barrier electrode comprises Ag/AgCl.

11. A display device comprising:
a first substrate and a second substrate, which are disposed to face each other and spaced apart from each other;
a first electrode mounted above the first substrate and a second electrode mounted above the second substrate, enabling a difference in electrical potential to be given between the first electrode and the second electrode;

a light-emitting layer disposed between the first substrate and the second substrate, the light-emitting layer comprising a light-emitting material which emits light through an electrochemical oxidation or reduction thereof and chloride ions; and a barrier electrode interposed between the first electrode and the second electrode to partition the light-emitting layer, the barrier electrode having a first end and a second end, the first end being in contact with the first substrate and the second end being in contact with the second substrate, and functioning as a spacer, the barrier electrode also functioning as a standard for the electrical potential.

12. The device according to claim 11, further comprising an AC power source providing potential difference between the first electrode and the second electrode;

and a controlled potential driving device connected with the first electrode, the second electrode and the barrier electrode.

13. The device according to claim 11, wherein the first substrate and the second substrate comprise glass or plastics.

14. The device according to claim 11, wherein the first electrode and the second electrode comprise a transparent conductive material.

15. The device according to claim 11, wherein the light-emitting material is selected from the group consisting of polycyclic aromatic compounds, π-electron conjugated polymers, heteroaromatic compounds, chelate metallic complexes, organometallic compounds and chelate lanthanoid complexes.

16. The device according to claim 11, wherein the light-emitting layer comprises a supporting salt.

17. The device according to claim 16, wherein the supporting salt is selected from the group consisting of tetrabutyl ammonium perchlorate, potassium hexafluorophosphate, lithium trifluoromethane sulfonate, lithium perchlorate, tetra-n-butyl ammonium tetrafluoroborate, tripropyl amine and tetra-n-butyl ammonium fluoroborate.

18. The device according to claim 11, wherein the light-emitting layer comprises a solvent.

19. The device according to claim 18, wherein the solvent is selected from the group consisting of acetonitrile, N,N-dimethyl formamide, propylene carbonate, o-dichlorobenzene, glycerin, water, ethyl alcohol, propyl alcohol, dimethyl carbonate, ethylene carbonate, γ-butyrolactone, NMP, 2-methyl tetrahydrofuran, toluene, tetrahydrofuran, benzonitrile, cyclohexane, normal hexane, acetone, nitrobenzene, 1,3-dioxolane, furan and benzofluoride.

20. The device according to claim 11, wherein the barrier electrode comprises Ag/AgCl.

* * * * *